(12) United States Patent  
Ouchi

(10) Patent No.: US 7,535,497 B2  
(45) Date of Patent: May 19, 2009

(54) GENERATION OF STATIC IMAGE DATA FROM MULTIPLE IMAGE DATA

(75) Inventor: Makoto Ouchi, Nagano-ken (JP)

(73) Assignee: Seiko Epson Corporation, Tokyo (JP)

( * ) Notice: Subject to any disclaimer, the term of this patent is extended or adjusted under 35 U.S.C. 154(b) by 672 days.

(21) Appl. No.: 10/963,781

(22) Filed: Oct. 12, 2004

(65) Prior Publication Data

US 2005/0200706 A1  Sep. 15, 2005

(30) Foreign Application Priority Data

Oct. 14, 2003  (JP)  ............................. 2003-353176

(51) Int. Cl.
H04N 5/262  (2006.01)

(52) U.S. Cl. .................... 348/239; 348/220.1; 345/629; 382/294

(58) Field of Classification Search .................. 348/36, 348/39, 143, 207.99, 218.1, 239, 33.11, 333.12, 348/169, 231.3, 220.1, 333.11; 382/154, 382/284, 291, 294, 282; 345/428, 634, 647, 345/660, 629

See application file for complete search history.

(56) References Cited

U.S. PATENT DOCUMENTS

| | | | | |
|---|---|---|---|---|
| 5,666,475 A | * | 9/1997 | Salesin et al. | 345/428 |
| 6,078,701 A | * | 6/2000 | Hsu et al. | 382/294 |
| 6,249,616 B1 | * | 6/2001 | Hashimoto | 382/284 |
| 6,392,658 B1 | * | 5/2002 | Oura | 345/629 |
| 6,434,265 B1 | * | 8/2002 | Xiong et al. | 382/154 |
| 6,535,650 B1 | * | 3/2003 | Poulo et al. | 382/284 |
| 6,549,215 B2 | * | 4/2003 | Jouppi | 345/660 |
| 6,681,056 B1 | * | 1/2004 | Tseng et al. | 382/282 |
| 7,064,783 B2 | * | 6/2006 | Colavin et al. | 348/231.3 |
| 7,119,816 B2 | * | 10/2006 | Zhang et al. | 345/634 |
| 2004/0017386 A1 | * | 1/2004 | Liu et al. | 345/647 |
| 2004/0022453 A1 | * | 2/2004 | Kusama et al. | 382/284 |
| 2004/0239763 A1 | * | 12/2004 | Notea et al. | 348/169 |
| 2005/0104902 A1 | * | 5/2005 | Zhang et al. | 345/629 |

(Continued)

FOREIGN PATENT DOCUMENTS

JP  05-191725  7/1993

(Continued)

OTHER PUBLICATIONS

Masatsugu Miyata, "Selecting Frames from a Video Stream for Image Mosaicing Based on Optical Flow," 1998, Bachelor thesis, Minoh Laboratory.*

(Continued)

*Primary Examiner*—Tuan V Ho  
*Assistant Examiner*—Dennis Hogue  
(74) *Attorney, Agent, or Firm*—Martine Penilla & Gencarella, LLP

(57) ABSTRACT

This invention provides a still image data generating apparatus for generating still image data from a plurality of frame mage data. The still image data generating apparatus comprises a positional relationship data generator configured to generate positional relationship data representing a relative positional relationship of images represented by the plurality of frame image data and an image data arrangement unit configured to generate still image data for which the plurality of frame image data are arranged in accordance with the positional relationship data.

4 Claims, 10 Drawing Sheets

U.S. PATENT DOCUMENTS

2007/0040913 A1* 2/2007 Fisher et al. ............. 348/218.1

FOREIGN PATENT DOCUMENTS

| JP | 07-200796 | 8/1995 |
|----|-----------|--------|
| JP | 09-214654 | 8/1997 |
| JP | 09-214868 | 8/1997 |

OTHER PUBLICATIONS

Kirk Duffin and William Barrett, "Fast Focal Length Solution in Partial Panoramic Image Stitching," Dec. 2001, Proceedings of the 2001 IEEE Computer Society Conference on Computer Vision and Pattern Recognition, Kauai, Hawaii, vol. II, pp. 690-695.*
M. Brown and D.G. Lowe, "Recognising Panoramas," Proceedings of the 9th International Conference on Computer Vision, Oct. 2003.*
Chen et al., "Video VR: A Real Time System for Automatically Constructing Panoramic Images from Video Clips," CAPTECH '98, 1998.*
Mann et al., "Video Orbits of the Projective Group: A Simple Approach to Featureless Estimation of Parameters," IEEE, 1997.*
Zoghlami et al., "Using Geometric Corners to Build a 2D Mosaic from a Set of Images," IEEE, 1997.*
Badra et al., "Rotation and Zooming in Image Mosaicing," IEEE, 1998.*
Lee et al., "Multi-resolution Mosaic Construction Using Resolution Maps," VLBV 2003, 2003.*
Abstract of Japanese Patent Publication No. JP 05-191725, Pub. Date: Jul. 30, 1993, Patent Abstracts of Japan.
Abstract of Japanese Patent Publication No. 07-200796 Pub. Date: Aug. 4, 1995, Patent Abstracts of Japan.
Abstract of Japanese Patent Publication No. 09-214654 Pub. Date: Aug. 15, 1997, Patent Abstracts of Japan.
Abstract of Japanese Patent Publication No. 09-214868 Pub. Date: Aug. 15, 1997, Patent Abstracts of Japan.

* cited by examiner

Second Embodiment

Fig.8(a) Translation motion
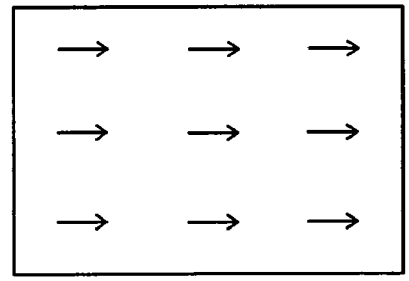
Fig.8(b) Rotation
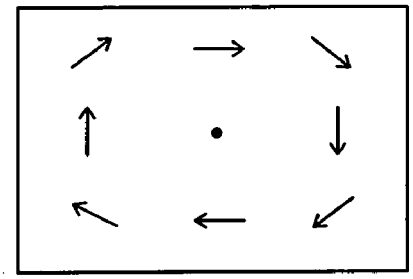
Fig.8(c) Zoom in
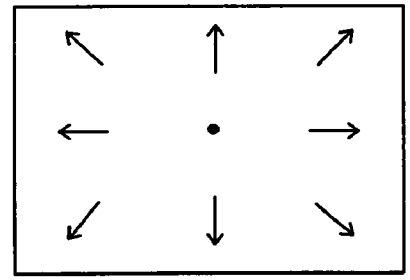
Fig.8(d) Zoom out
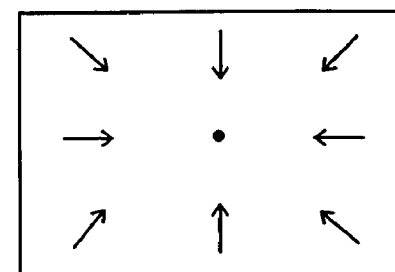

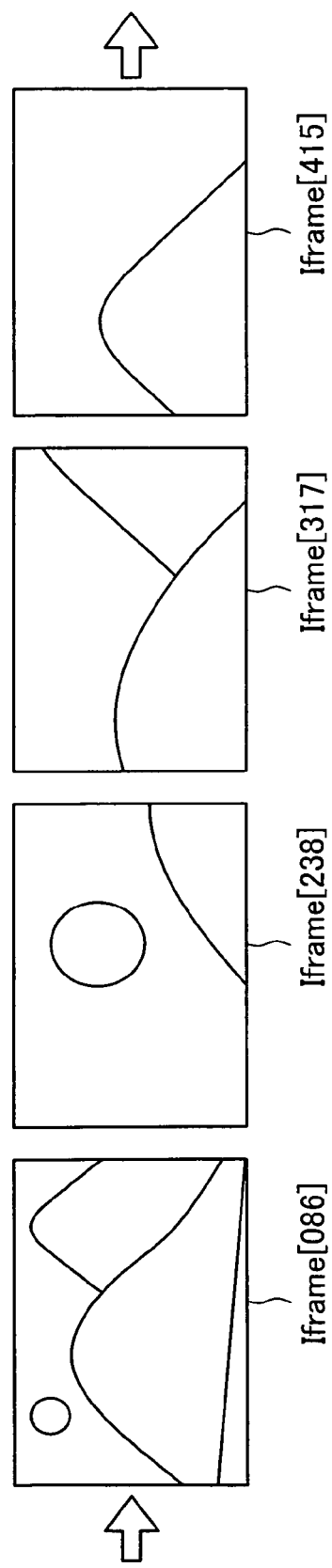

GENERATION OF STATIC IMAGE DATA FROM MULTIPLE IMAGE DATA

BACKGROUND OF THE INVENTION

1. Field of the Invention

The present invention relates to an art for generating still image data from a plurality of image data.

2. Description of the Related Art

In recent years, art for generating still image data from moving image data recorded using a digital video camera or other moving image imaging device has been becoming more widespread. For the process of generating still image data from moving image data, generally, it is possible to generate a plurality of still image data from moving image data, so the task of organizing the generated plurality of still image data arises. Furthermore, cases are also assumed of it being difficult to grasp where a subject, for an image for which part of the subject has been imaged, has moved to.

In such a case, if the positional relationship of the images represented by a plurality of still image data is displayed, this lightens the burden of the organizing task and of understanding the still images. Furthermore, the type of problems described above are not limited to generation of still image data from moving image data, but the same problems may also occur for a plurality of successively imaged still image data, for example.

However, conventionally, use of information representing the positional relationship of a plurality of still image data for this kind of application had not been thought of.

SUMMARY OF THE INVENTION

The present invention was created to solve the problems described above for the prior art, and its purpose is to provide an art for acquiring information representing the positional relationship of a plurality of still image data for the process of generating still image data from a plurality of still image data.

To solve at least part of the problems described above, the present invention provides a still image data generating method of generating still image data from a plurality of frame image data. The still image data generating method comprises: (a) a positional relationship data generating step of generating positional relationship data representing a relative positional relationship of images represented by the plurality of frame image data; and (b) an image data arrangement step of generating still image data for which the plurality of frame image data are arranged in accordance with the positional relationship data.

With the still image data generating device of the present invention, it is possible to arrange these frame image data according to the positional relationship data representing the relative positional relationship of images represented by the plurality of frame image data acquired from the plurality of frame image data, allowing for reduction of the burden on the user for understanding and organizing still images.

Here, "frame image data" includes not only still image data for forming non-interlace format moving image data, but also still image data for forming interlace format moving image data. In the case of the interlace format, each of the frame image data correlates to still image data generated from, for example, odd numbered field still image data formed from image data of odd numbered scan lines, and even numbered field still image data formed from image data of even numbered scan lines. Furthermore, "frame image data" is a broad concept including not only still image data that forms moving image data, but also a plurality of still image data imaged successively, for example.

Note that the present invention may be realized in various formats such as a still image data output device, an image file generating device, a computer program for realizing on a computer the functions of a still image data generating method or device, a recording medium on which that computer program is recorded, computer program products, and the like.

BRIEF DESCRIPTION OF THE DRAWINGS

FIG. 2 is an explanatory drawing showing an operating display screen 200 displayed on a display 18a.

FIGS. 8(a), 8(b), 8(c), and 8(d) are explanatory drawings showing the typical estimate results of optical flow estimation when there are nine sample points.

FIG. 9 is an explanatory diagram showing a frame image selected by a user for the second embodiment of the present invention.

DESCRIPTION OF THE PREFERRED EMBODIMENTS

Following, aspects for embodiment of the present invention are described based on embodiments in the following sequence.

Figure 1:
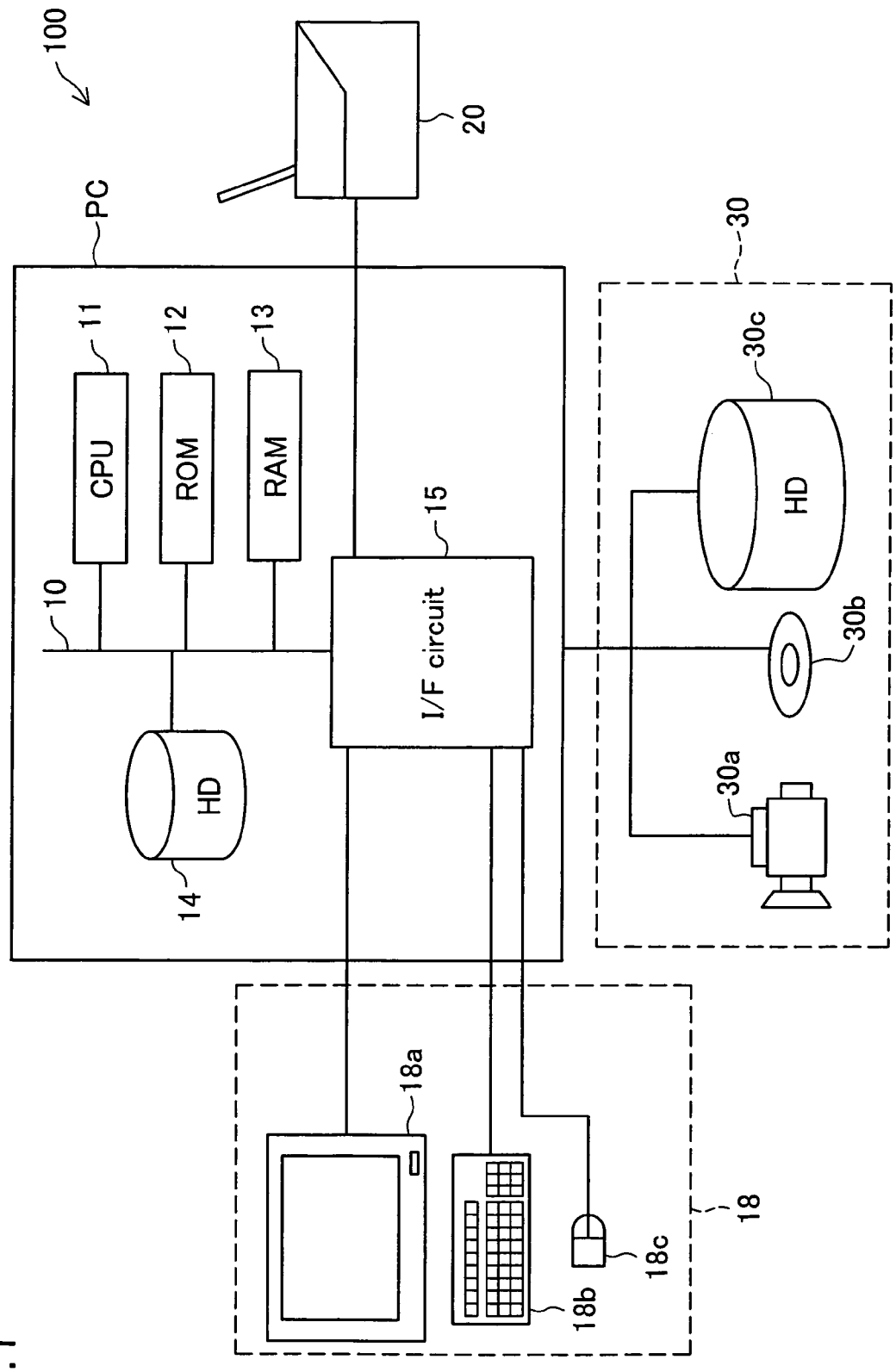
FIG. 1 is an explanatory drawing showing an image processing system 100 as an embodiment of the present invention.

A. Image Processing System Constitution:
B. Still Image Data Generating Process for a First Embodiment of the Present Invention:
C. Still Image Data Generating Process for a Second Embodiment of the Present Invention:
D. Variation Examples:

A. Image Processing System Constitution:

FIG. 1 is an explanatory drawing showing an image processing system 100 as an embodiment of the present invention. The image processing system 100 comprises an moving image database unit 30 for supplying moving image data, a user interface unit 18 for specifying a plurality of still image data acquired from moving image data, a personal computer PC as an image processing device for performing image processing on a plurality of still image data acquired from the moving image database unit 300 [sic; 30], and a color printer 20 as an output device for outputting processed still image data.

The personal computer PC comprises a CPU 11 for executing arithmetic processing for image processing, a ROM 12, a hard disk 14 for storing application software for image processing, a RAM 13 for temporarily storing image data or application programs, and an interface circuit 15 for performing the interfacing with an external device such as a moving image database unit 30, a user interface unit 18, or a color printer 20.

The moving image database unit 30 comprises a digital video camera 30a, a DVD 30b, and a hard disk 30c as moving image data supply sources. The moving image data is supplied to the personal computer PC as a collection of frame image data successively in time sequence. With this embodiment, frame image data is still image data for each frame. Note that with this embodiment, the time for one frame is 33 ms, and frame numbers are given in order of time sequence to each frame image data.

The user interface unit 18 is a user interface for the user to specify frame image data acquired from moving image data. The user interface unit 18 comprises a display 18a for displaying moving images supplied from the moving image database unit 20, still images being generated, and an operating display screen to be described later; and a keyboard 18b and a mouse 18c for receiving input from a user.

Figure 2:
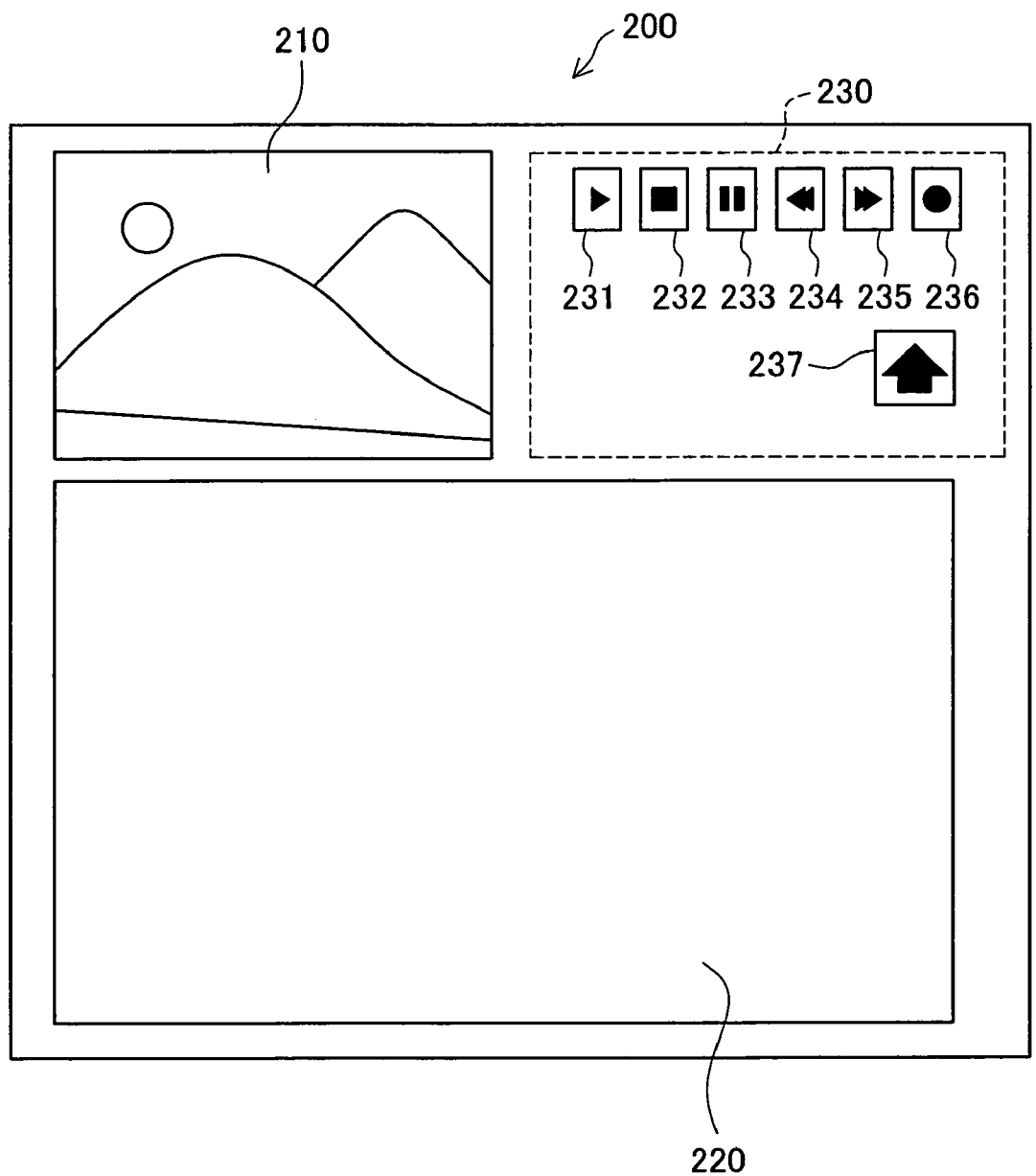

FIG. 2 is an explanatory drawing showing an operating display screen 200 displayed on the display 18a. The operating display screen 200 comprises a moving image area 210 for displaying moving images, a still image area 220 for displaying still images being generated, and an operating area 230 for receiving operation input by the user. Note that a preview screen for which the resolution has been dropped is displayed in the moving image area 210 and the still image area 220.

The operating area 230 comprises a plurality of buttons including various buttons for controlling moving images displayed in the moving image area 210, a frame image acquisition button 236, and a still image generating button 237. Various buttons for controlling moving images include a play button 231, a stop button 232, a pause button 233, a rewind button 234, and a fast forward button 235.

With the hardware constitution described above, still image data including a plurality of frame images arranged so as to represent the positional relationship during image acquisition is generated as shown below. Note that the personal computer PC functions as the "frame image data acquisition unit," the "positional relationship data generating unit," and the "image data arrangement unit" noted in the claims.

Figure 3:
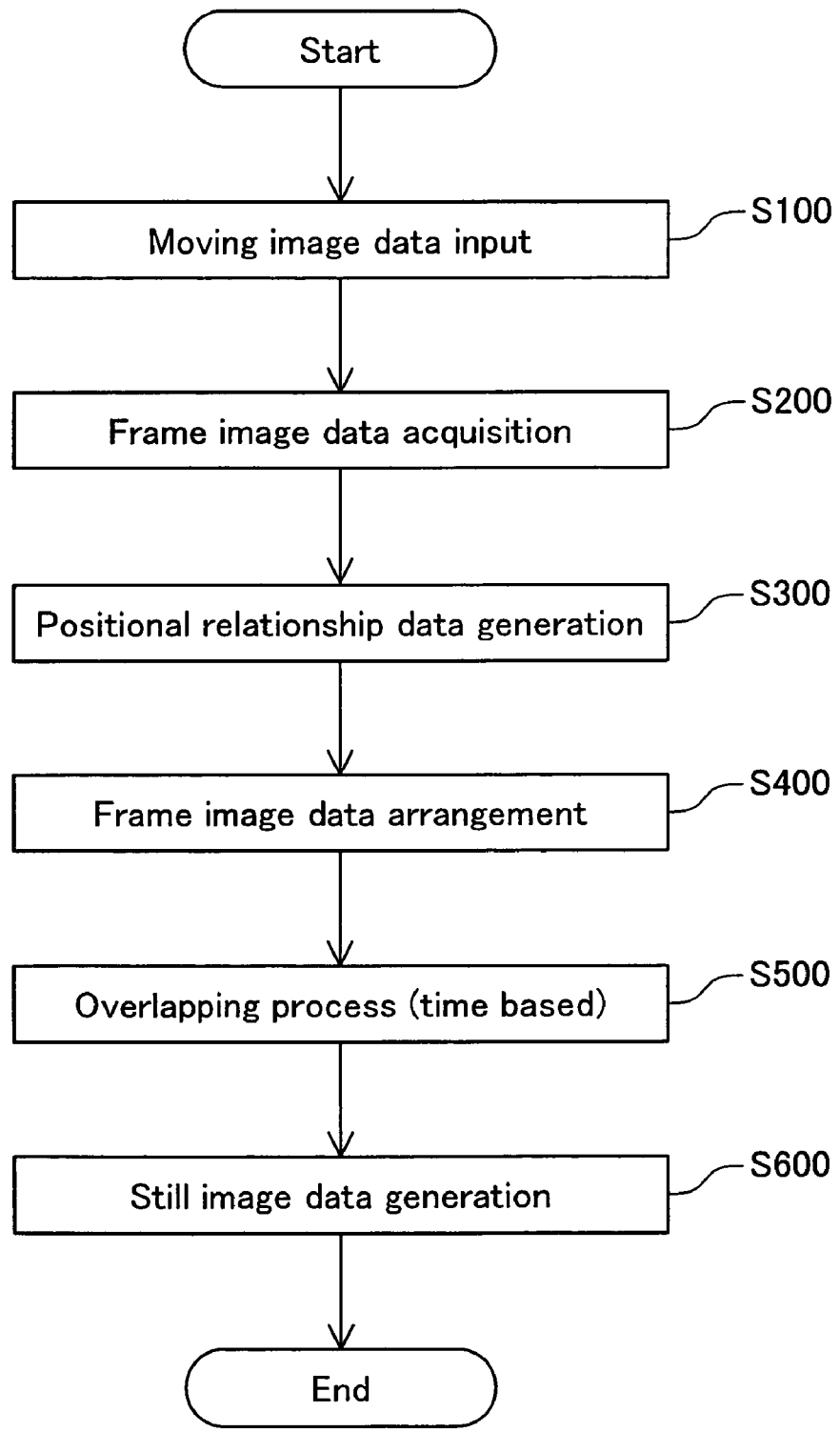
FIG. 3 is a flow chart showing the contents of the still image data generating process of a first embodiment of the present invention.

B. Still Image Data Generating Process for a First Embodiment of the Present Invention:

FIG. 3 is a flow chart showing the contents of the still image data generating process of the first embodiment of the present invention. At step S100, the personal computer PC receives supply of moving image data from the moving image database unit 30. The supplied moving image data is buffered in the RAM 13 and also displayed in the moving image area 210.

At step S200, the personal computer PC acquires frame image data according to input from the user. Input from the user is performed by placing a cursor (not illustrated) over the frame image acquisition button 236 and clicking the mouse 18c.

Figure 4:
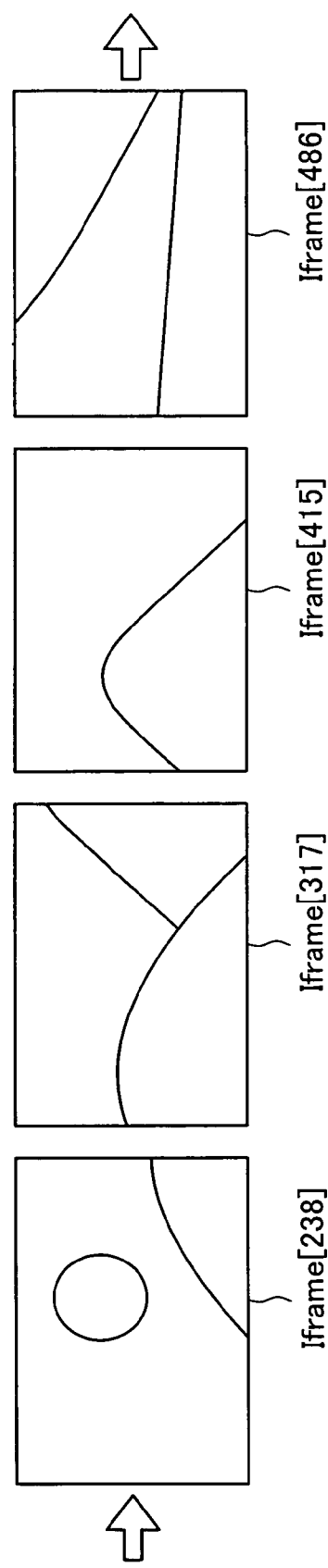
FIG. 4 is an explanatory drawing showing a frame image selected by a user.

FIG. 4 is an explanatory drawing showing a frame image selected by the user. With this example, it is assumed that the digital video camera 30a zooms in on a scene (FIG. 2) with the setting sun as a background and also pans the screen (FIG. 2) from the upper left toward the lower right.

The four images Iframe [238], Iframe [317], Iframe [415], and Iframe [486] indicate each part of the scene (FIG. 2). Here, the image Iframe [238] means the frame image of the frame number 238.

When the second image Iframe [317] is selected, the personal computer PC automatically generates positional relationship data (step S300). The positional relationship data is data representing the positional relationship between the first image Iframe [238] and the second image Iframe [317]. With this embodiment, it is assumed that the digital video camera 30 will do panning, so the positional relationship data is a translational movement vector. The translational movement vector is represented by the horizontal direction and the vertical direction pixel count.

For the translational movement vector, for example, when the selected successive frame image data time interval is relatively short, the overlapping image area is wide, so it is possible to generate this using publicly known image processing art such as pattern matching or special point tracking of these images. Meanwhile, when the successive frame image data time interval is relatively long, it is desirable to form the translational movement vector by generating and synthesizing it for each 10 frames (0.33 seconds), for example. In this case, the 10 frames correlates to the "specified frame interval" noted in the claims.

At step S400, the personal computer PC arranges the two images Iframe [238] and Iframe [317] based on the positional relationship data. At step S500, overlapping processing is implemented on the arranged two images Iframe [238] and Iframe [317]. The overlapping process is a process of using as the pixel value of the overlapping area the pixel data of the image frame that is later in terms of time for the area for which the two images Iframe [238] and Iframe [317] overlap.

Figure 5:
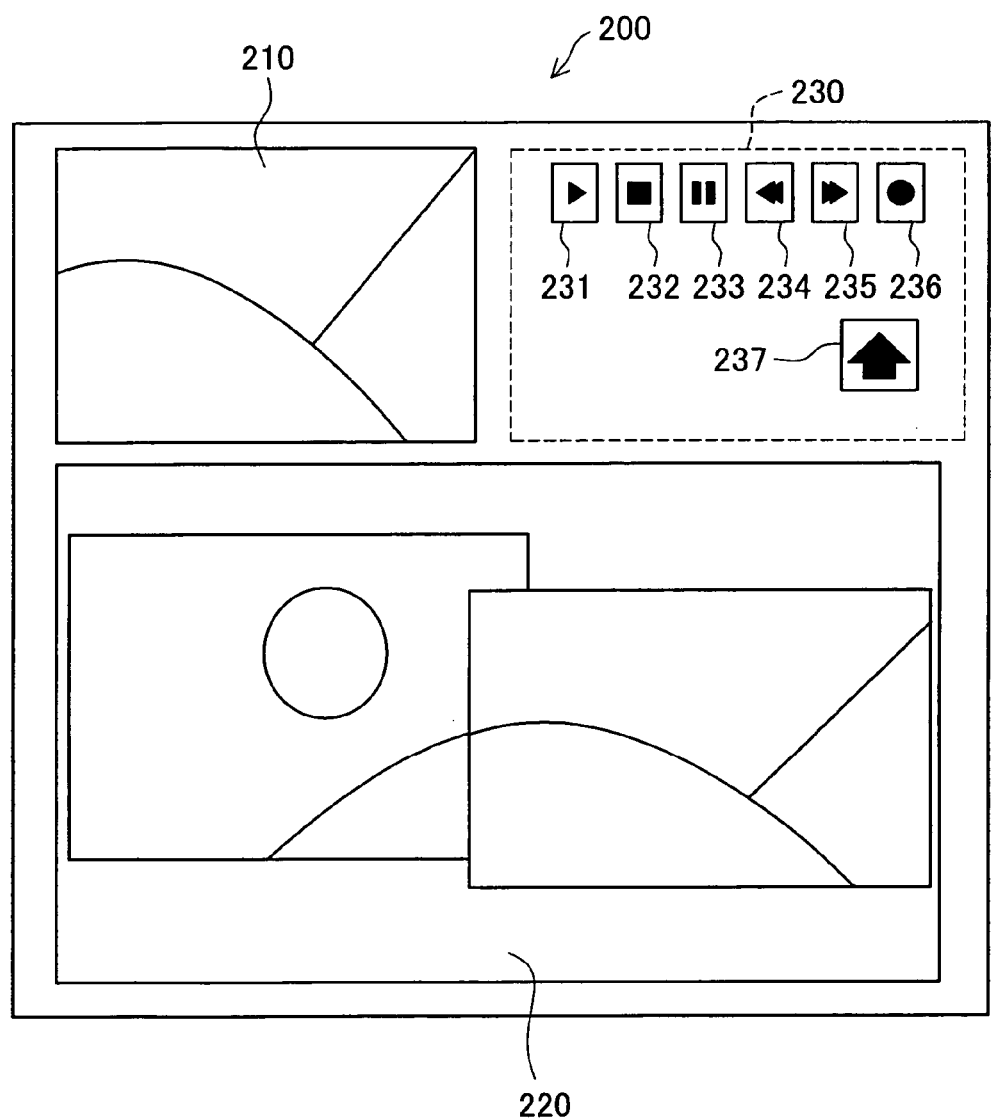
FIG. 5 is an explanatory drawing showing the status of still image data being generated with an embodiment of the present invention.

This kind of process is processed in real time for each image selection by the user and the kind of still image being generated shown in FIG. 5 is displayed in the still image area 220. The same process is performed for selection of the third image Iframe [415] and the fourth image Iframe [486].

Figure 6:
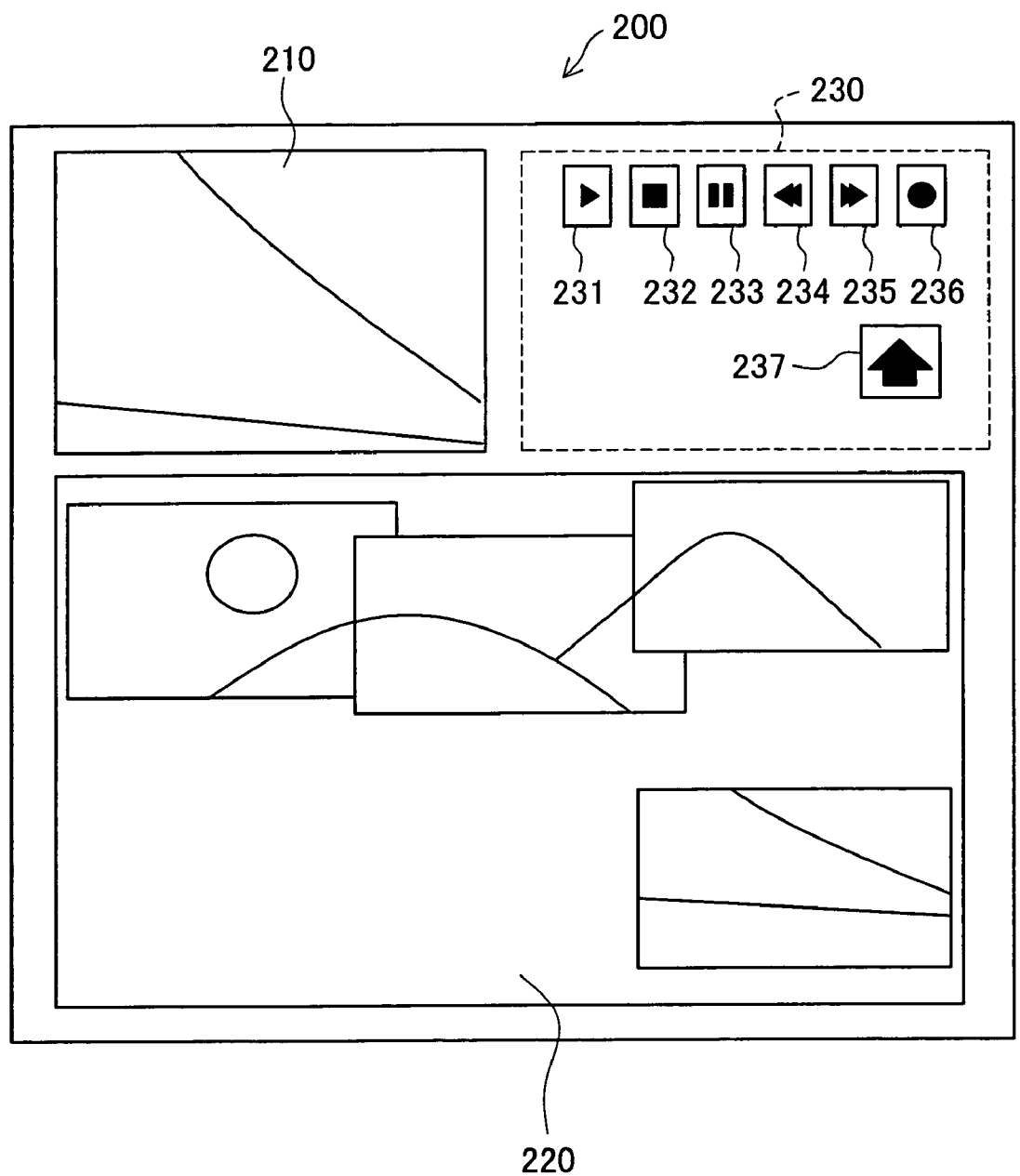
FIG. 6 is an explanatory drawing showing the operating display screen 200 when a fourth frame image Iframe [486] is selected.

FIG. 6 is an explanatory drawing showing the operating display screen 200 when the fourth frame image Iframe [486] is selected. The selected frame image Iframe [486] is displayed in the moving image area 210. In this state, when the still image generating button 237 is clicked, still image data for representing the image displayed in the still image area 220 is generated (step S600).

In this way, with the first embodiment, it is possible to generate still image data for which frame image data is arranged according to the relative positional relationship of the images, so it is possible to generate still image data for which it is easy to understand the positional relationship of each frame image.

Figure 7:
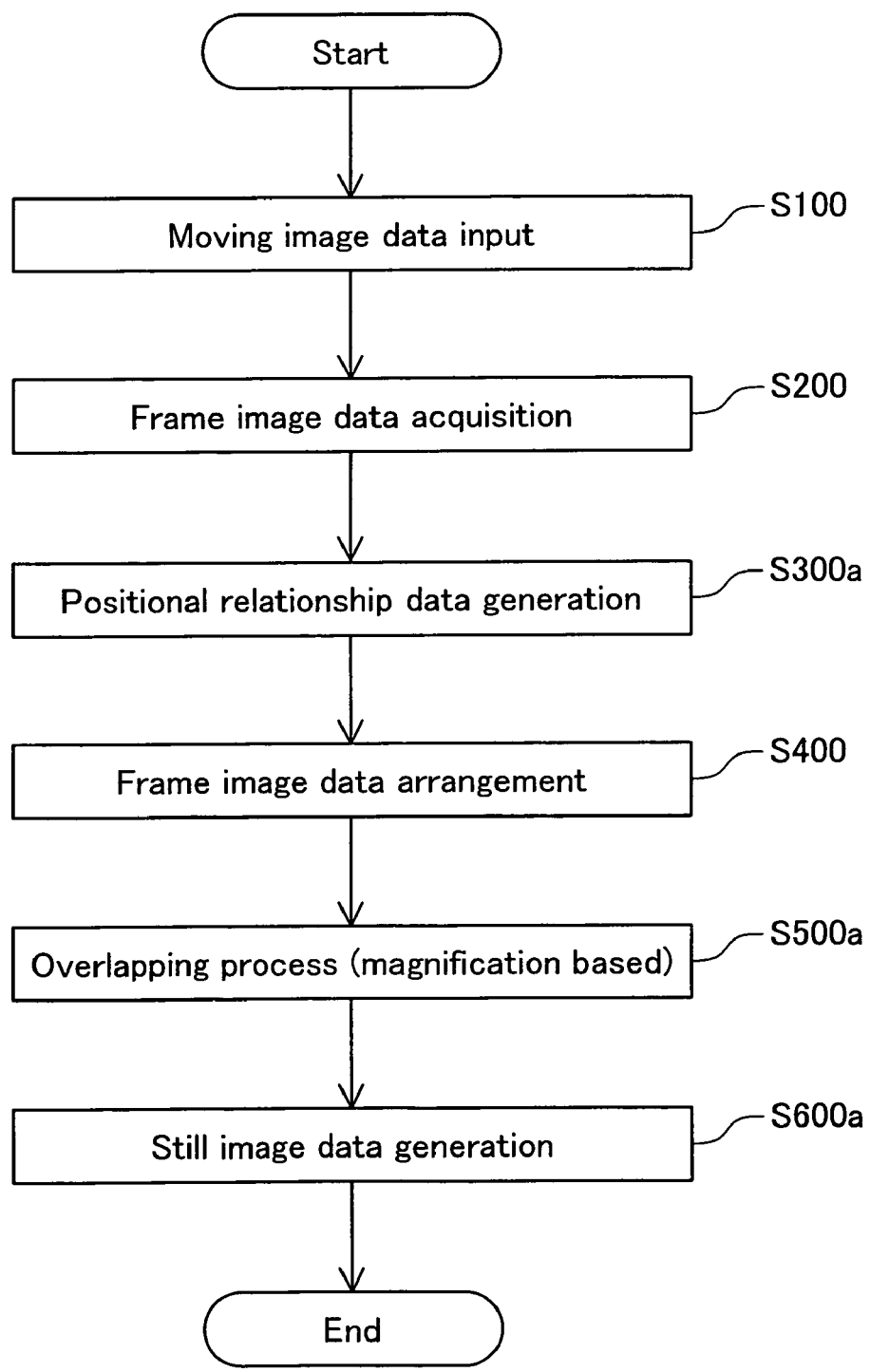
FIG. 7 is a flow chart showing the contents of the still image data generating process of a second embodiment of the present invention.

C. Still Image Data Generating Process for a Second Embodiment of the Present Invention:

FIG. 7 is a flow chart showing the contents of the still image data generating process of a second embodiment of the present invention. The still image data generating process of the first embodiment has a prerequisite of panning between successive images, but the still image data generating process of the second embodiment is different in that it assumes not only panning but also performance of other camera operations such as the zoom operation and rotation operation.

This kind of feature is realized by changing the contents of the positional relationship data generating process (step S300), the overlapping process (step S500), and the still image data generating process (step S600).

With the positional relationship data generating process (step S300a) of the second embodiment, the positional relationship data includes not only the translational movement vector but also a rotation angle and an image magnification. The rotation angle and the image magnification may be realized by combining an optical flow estimation and pattern matching, for example. There are various methods for optical flow estimation, and with the gradient-based method, for example, under the presumption that the brightness of the subject between the observed frame images does not change, the relationship between the space gradient and the time gradient of the concentration distribution of the subject in the image is used and the movement of the subject is estimated with the camera as a reference.

Generation of relative position data for this embodiment is performed by roughly estimating the image translational movement and rotation as well as the zoom magnification change based on the results of the optical flow estimation, and also performing pattern matching between processed frame images based on these estimation results.

FIGS. 8(a), 8(b), 8(c), and 8(d) are explanatory drawings showing the typical estimate results of optical flow estimation when there are nine sample points. FIG. 8(a) to FIG. 8(d) show the estimation results in a case when the subject has stopped, when the digital video camera 30a pans side to side, rotates counterclockwise, zooms in, and zooms out, respectively. In this way, with the optical flow estimation, it is possible to estimate the contents of camera operations not only of panning, but also when performing other camera operations such as the zoom operation and the rotation operation, so it is possible to generate positional relationship data including information such as the rotation angle and the image magnification as well.

With the overlapping process (step S500a) of the second embodiment, processing is performed for which overlapping of the plurality of frame image data in the overlapping area uses the magnification as a reference. In specific terms, image processing is performed so that the larger the magnification of the frame image data, the greater the priority for selection. The reason that selection priority is given the bigger the magnification of the frame image data is that it is possible to reproduce images with higher resolution the bigger the magnification of the frame image data.

FIG. 9 is an explanatory diagram showing a frame image selected by the user for the second embodiment of the present invention. With this example, the same as with the first embodiment, the digital video camera 30a zooms in on a scene for which the setting sun is the background (FIG. 2), and also assumes there will be panning from the upper left toward the lower right of the screen (FIG. 9).

A first image Iframe [086] is an image for representing the overall scene (FIG. 2). Three images from the second and thereafter Iframe [238], Iframe [317], and Iframe [415] are zoomed-in images with relatively high magnification, indicating each part of the background (FIG. 2). As a result, the three images from the second and thereafter Iframe [238], Iframe [317], and Iframe [415] are selected with priority in relation to the first image Iframe [086]. Furthermore, for the three images from the second and thereafter Iframe [238], Iframe [317], and Iframe [415], the same as with the first embodiment, images that come later in terms of time have priority for selection.

Figure 10:
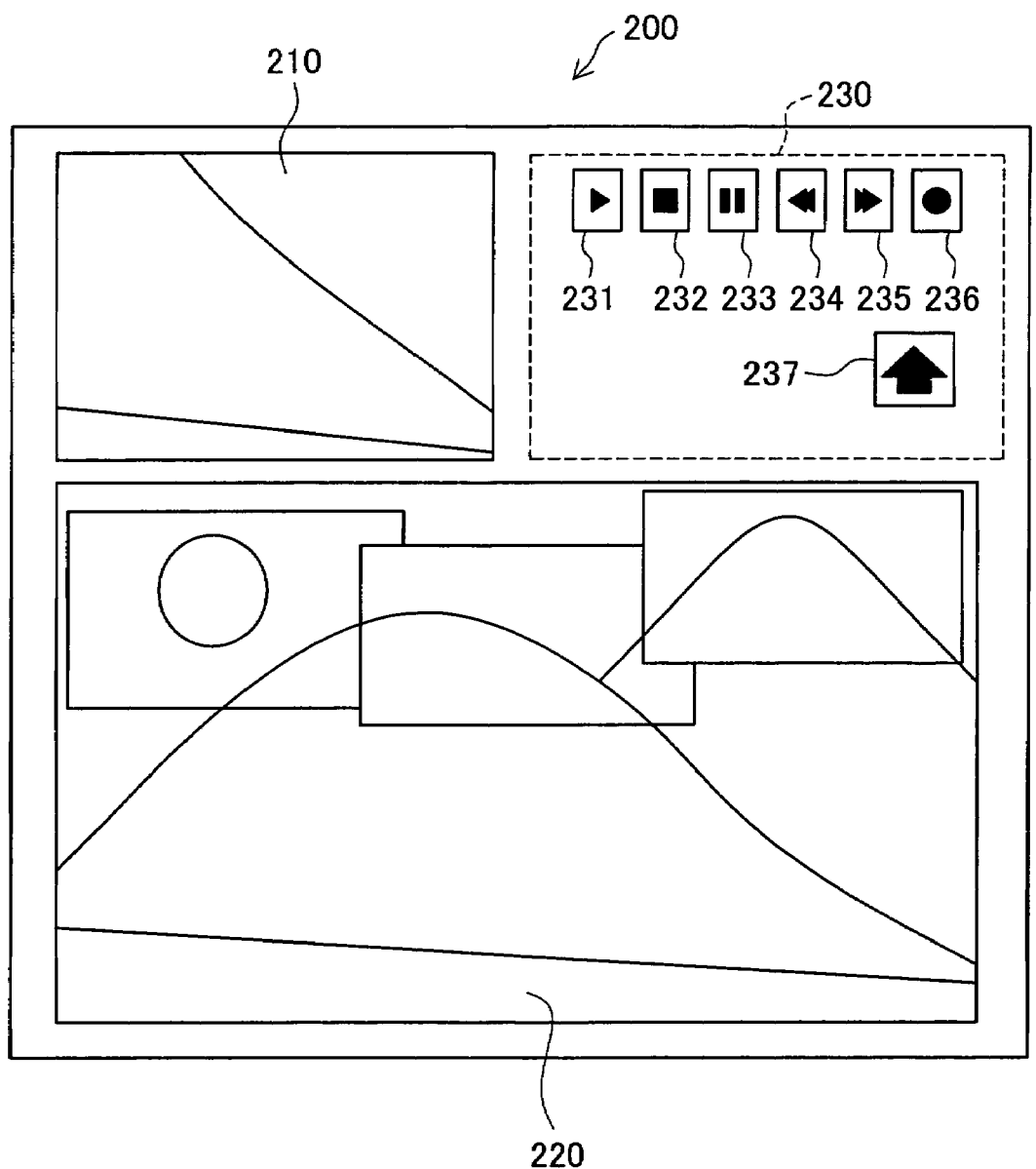
FIG. 10 is an explanatory diagram showing the operating display screen 200 when a fourth frame image Iframe [415] is selected.

FIG. 10 is an explanatory diagram showing the operating display screen 200 when the fourth frame image Iframe [415] is selected. Displayed in the still image area 220 are still image data for which the four frame images Iframe [086], Iframe [238], Iframe [317], and Iframe [415] are synthesized (step S500). In this state, when the still image generating button 237 is clicked, still image data representing the image displayed in the still image area 220 is generated (step S500a).

With the still image data of the second embodiment (step S500a), in contrast to the first embodiment, when generating the still image data, a resolution adjustment process is performed. The reason that the resolution adjustment process is performed is because the magnification of each frame image data is different. In specific terms, by performing an interpolation process of frame interpolation or median interpolation on frame image data with a relatively low magnification (with the example noted above, the initial image Iframe [086]), the resolution is made to match the other three frame image data.

In this way, the second embodiment has the advantage of being able to generate positional relationship data not only with panning but also in cases when doing other camera operations such as zoom operations and rotation operations.

D. Variation Examples:

Note that the present invention is not limited to the embodiments and working examples noted above, but can be implemented in various aspects without straying from the main spirit of the claims, and variations such as the following are possible, for example.

D-1. With the embodiments described above, because the subject is a scene with little movement, with the optical flow estimation, the camera operation is estimated, but, for example, it is also possible to apply the present invention when the subject is moving. With the optical flow estimation, it is possible to estimate the relative positional relationship of the subject and the moving image imaging device, so it is also possible to use the present invention for application such as synthesizing parts of images of a subject moving at high speed, for example.

D-2. With the embodiments described above, positional relationship data is generated according to frame image data, but, for example, when the zoom magnification or other attribute information during other moving image imaging is included in the moving image data, the constitution may be such that the positional relationship data is generated using this attribute information.

D-3. With the embodiments described above, the image data was formed with non-interlace format frame image data, but the present invention may also be used for interlace format moving image data. In this case, each frame image data for the embodiments described above would correlate to still image data generated from odd numbered field still image data formed from image data of odd numbered scan lines, and even numbered field still image data formed from image data of even numbered scan lines.

D-4. With the embodiments described above, still image data is generated from moving image data, but this is not limited to moving image data, and, for example, it is also possible to generate still image data from a plurality of successively imaged still image data. Note that the "frame image data" noted in the claims is a broad concept including this kind of still image data.

With the embodiments noted above, part of a constitution realized using hardware may be replaced by software, and conversely, part of a constitution realized using software may also be replaced by hardware.

When part or all of the functions of the present invention are realized using software, that software (computer program) may be provided in a format stored on a computer readable recording medium. For this invention, a "computer readable recording medium" is not limited to a portable recording medium such as a flexible disk or a CD-ROM, but also includes internal storage devices within the computer such as various types of RAM or ROM or the like, or external recording devices attached to a computer such as a hard disk or the like.

Finally, the Japanese patent application used as a basis for the priority claim of this application (Patent Application 2003-353176 (application date: Oct. 14, 2003)) is disclosed herein by way of reference.

What is claimed is:

1. A still image display method of displaying a still image in a display unit using a motion image, the motion image including multiple frame images which are continuous in a time sequence, the still image display method comprising:
   (a) displaying the motion image in a first display area of the display unit;
   (b) displaying an operation icon to be used by a user in a second display area;
   (c) accepting a select request via the operation icon, the select request requesting selection of a subject frame image that is being displayed in the first display area, when the select request is made;
   (d) generating spatial positional relationship data representing a relative spatial positional relationship of the subject frame image and other subject frame images which have been selected prior to the selection of the subject frame image, when the select request is accepted; and
   (e) displaying the subject frame image selected in step (c) in a third display area in accordance with the spatial positional relationship data, in addition to the other subject frame images, the displaying of the subject frame image being caused by the selection of the subject image,
   wherein if a plurality of subject frame images has overlapping pixels with mutually different resolutions, step (e) includes displaying the overlapping pixels of the subject frame image with a relatively high resolution,
   wherein if the plurality of subject frame images has overlapping pixels with mutually same resolutions, step (e) includes displaying the overlapping pixels of the subject frame image that comes later in the time sequence, and
   wherein the spatial positional relationship data includes first data representing a relative translational relationship of the subject frame image and other subject frame images, second data representing a relative rotational relationship of the subject frame image and other subject frame images, and third data representing a relative zooming relationship of the subject frame image and other subject frame images.

2. The still image display method in accordance with claim 1, wherein
   the multiple frame images are generated by imaging a subject with a still image imaging device, wherein
   the generating of spatial positional relationship data in step (d) comprises the steps of:
   estimating a spatial positional relationship of the subject frame image and the still image imaging device when generating the multiple frame images using an optical flow estimation; and
   generating the spatial positional relationship data in accordance with the estimated spatial positional relationship.

3. A still image display apparatus for displaying a still image in a display unit using a motion image, the motion image including multiple frame images which are continuous in a time sequence, the still image display apparatus comprising:
   a display unit that displays the motion image in a first display area and an operation icon in a second display area, the operation icon to be used by a user to accept a select request that requests selection of a subject frame image that is being displayed in the first display area, when the select request is made;
   a spatial positional relationship data generator that generates spatial positional relationship data representing a relative spatial positional relationship of the subject frame image and other subject frame images which have been selected prior to the selection of the subject frame image, when the select request is accepted;
   wherein the subject frame image selected by the user is displayed in a third display area of the display unit in accordance with the spatial positional relationship data, in addition to other subject frame images, the displaying of the subject frame image being caused by the selection of the subject image,
   wherein if a plurality of subject frame images has overlapping pixels with mutually different resolutions, the overlapping pixels of the subject frame image with a relatively high resolution are displayed in the third display area of the display unit,
   wherein if the plurality of subject frame images has overlapping pixels with mutually same resolutions, the overlapping pixels of the subject frame image that comes later in the time sequence are displayed in the third display area of the display unit, and
   wherein the spatial positional relationship data includes first data representing a relative translational relationship of the subject frame image and other subject frame images, second data representing a relative rotational relationship of the subject frame image and other subject frame images, and third data representing a relative zooming relationship of the subject frame image and other subject frame images.

4. A computer-readable storage medium having a computer program stored thereon, the computer program causing a computer to display a still image in a display unit using a motion image, the motion image including multiple frame images which are continuous in a time sequence, the computer program comprising:
   a first program for causing the computer to display the motion image in a first display area of the display unit;
   a second program for causing the computer to display an operation icon to be used by a user in a second display area of the display unit;
   a third program for causing a computer to accept a select request via the operation icon, the select request requesting selection of a subject frame image that is being displayed in the first display area, when the select request is made;
   a fourth program for causing the computer to generate spatial positional relationship data representing a relative spatial positional relationship of the subject frame image and other subject frame images which have been selected prior to the selection of the subject frame image, when the select request is accepted; and
   a fifth program for causing the computer to display the subject frame image selected by the user in a third display area of the display unit in accordance with the spatial positional relationship data, in addition to the other subject frame images, the displaying of the subject image being caused by the selection of the subject image,
   wherein if a plurality of the subject frame images has overlapping pixels with mutually different resolutions, the fifth program causes the computer to display the overlapping pixels of the subject frame image with a relatively high resolution, and wherein if the plurality of subject frame images has overlapping pixels with mutually same resolutions, the fifth program causes the computer to display the overlapping pixels of the subject frame image that comes later in the time sequence, and wherein the spatial positional relationship data includes first data representing a relative translational relationship of the subject frame image and other subject frame images, second data representing a relative rotational relationship of the subject frame image and other subject frame images, and third data representing a relative zooming relationship of the subject frame image and other subject frame images.

* * * * *